March 18, 1941.  O. G. NORTON ET AL  2,235,297
PISTON RING
Filed March 6, 1939  2 Sheets-Sheet 1

Inventors
Oliver G. Norton
Thurlow E. McFall
By Linnance and
Van Antwerp
Attorneys

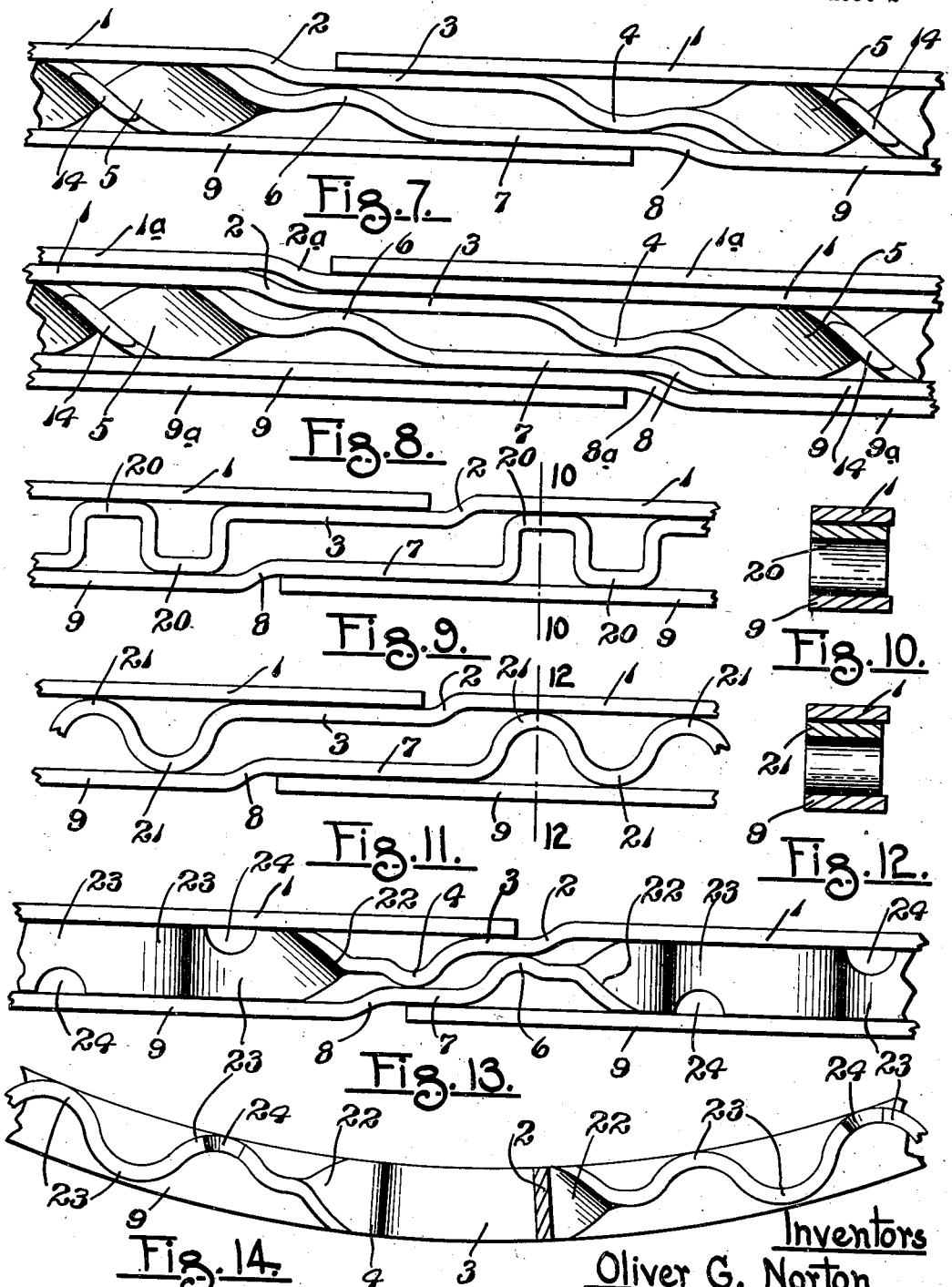
March 18, 1941. O. G. NORTON ET AL 2,235,297
PISTON RING
Filed March 6, 1939 2 Sheets-Sheet 2
Inventors
Oliver G. Norton
Thurlow E. McFall
Attorneys Patented Mar. 18, 1941

2,235,297

UNITED STATES PATENT OFFICE 2,235,297

PISTON RING

Oliver G. Norton, Muskegon, and Thurlow E. McFall, Sparta, Mich.; said Norton assignor to Muskegon Piston Ring Company, Muskegon, Mich., a corporation of Michigan Application March 6, 1939, Serial No. 259,942

10 Claims. (Cl. 309—45)

This invention relates to piston rings and more particularly to rings of the oil control or drainage type commonly installed in the lower grooves of the vertical pistons of internal combustion engines. Oil control rings have passages from their outer to their inner sides for conveying oil scraped from the cylinder walls to the bottoms of the piston ring grooves, from which drainage openings extend through the wall of the piston to its hollow interior.

A common cause of failure of oil control rings is due to carbon accumulation in the drainage holes or slots. This has resulted in attempts to increase the drainage area by making the holes or slots larger with a resultant weakening of the ring structure. With most rings the maximum of drainage area consistent with satisfactory strength approximates 20 per cent of the face area of the ring. With our invention a net drainage area of 40 to 50 per cent of the face area of the ring is obtained without sacrifice of structural strength. The preferred twisted structure hereafter described provides closely spaced columns in direct compression which serve to hold the side members securely and effectively in spaced relation to each other within the piston ring groove.

The present invention is directed to a piston ring structure wherein there are upper and lower narrow thin ring members spaced vertically from each other, the outer edges of which engage the inner walls of a cylinder; and between said upper and lower ring members a spacer is provided preferably having a twisted form and made from strip material preferably continuous and integral with the upper and lower ring members. More specifically our invention is directed to making the entire piston ring, including the upper and lower ring member and the twisted spacing or intermediate member from a single length of flat thin steel or other suitable material. Where the use of different materials for the ring members or the spacer may be desired, or where economy in material or manufacturing cost may be served such differing materials may be used and connected together in continuity as by welding, brazing, riveting, or otherwise securing together so as to be substantially in effect integral, and our invention is not to be limited other than as required by the claims appending hereto. The invention is also concerned with various modifications of this general structure, one being concerned with providing a piston ring for wider ring grooves and others with different formations and shapes of the intermediate spacing member or section of the ring, all of which will appear fully and in detail in the following description.

The invention may be understood from such description, taken in connection with the accompanying drawings, in which:

Fig. 7 is a fragmentary enlarged elevation at the parting portion of the ring shown in Fig. 1, showing a preferred method of supporting the free ends of the side members.

Fig. 8 is a similar view in which the side members are doubled, a construction permissible particularly for use in wider ring grooves.

Fig. 9 is an elevation similar to Fig. 1, illustrating a modification in structure wherein the twisted intermediate section of the ring has an equivalent therefor.

Fig. 10 is a transverse section on the line 10—10 of Fig. 9.

Fig. 11 is a view similar to Fig. 9 with the intermediate spacing portion of the ring still further modified.

Fig. 12 is a vertical transverse section on the line 12—12 of Fig. 11.

Fig. 13 is an elevation similar to Figs. 7 and 8 of a yet further form embodying the invention, and Fig. 14 is a plan view of the ring shown in Fig. 13 with the upper ring member removed.

Like reference characters refer to like parts in the different figures of the drawings.

Figure 1:
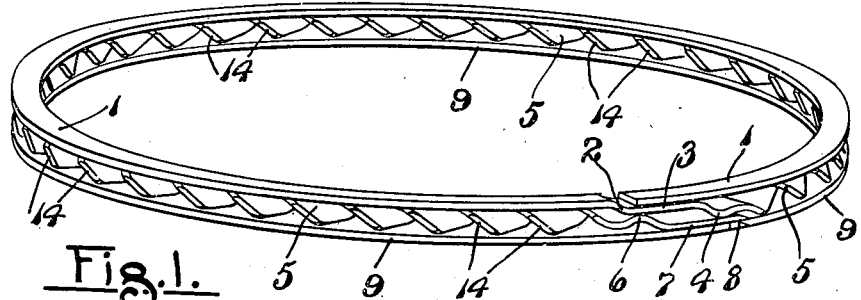
Fig. 1 is a perspective view of a preferred form and structure embodying the invention.
Figure 2:
Fig. 2 is an elevation with parts broken away, illustrative of a first step or operation in the manufacture of the preferred ring.
Figures 3, 4:
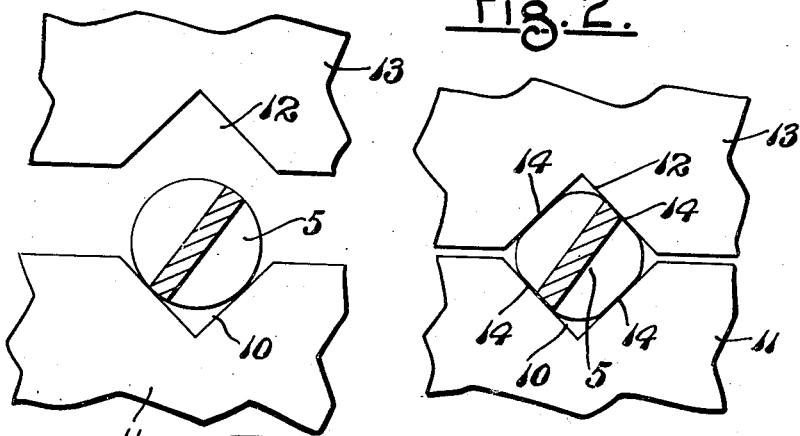
Figs. 3 and 4 are elevations indicative of one method by which the twisted section of the ring may be shaped or coin-pressed to desired size.

In the preferred structure shown in Figs. 1 to 7 inclusive, a length of flat steel or other material having the desired characteristics is formed into substantially circular shape to provide an upper ring member 1, a twisted spacer member below the upper ring member and a lower ring member below the spacer member. As the material of the upper ring member approaches the end of its first complete convolution, it is bent slightly downward as at 2, and thence continued as a section 3 directly underneath the free end portion of the ring member 1 for a short distance as shown, thence bent downwardly and formed into a hump 4, convex at its under side, and continued in a twisted member 5 which in substantially circular form lies directly underneath the upper ring member 1 until the part 2 is closely approached, whereupon the thin flat material is formed into an upwardly extending hump 6, convex at its upper side which bears against the under side of the section 3 substantially directly below the free end portion of the upper ring member 1. From the hump 6 the thin flat steel material is continued as a flat section 7 to a point underneath and slightly beyond the hump 4 and is thereupon downwardly bent, as at 8, and then continued in a lower ring member 9 of substantially circular form like the upper ring member 1, under the twisted spacing member 5. The end of the lower member stops slightly short of the downwardly bent section 8.

Another way of forming the lapped expansion joint of the ring is shown in Figs. 9 and 11, in which the reverse bend supports at points near or under the free ends of the outer ring members are omitted. Various other forms and modifications in detail structure will occur to others, and have occurred to us, and the invention is not to be specifically limited to the structures disclosed.

One method of manufacturing the ring in the preferred form is described as follows: A length of the thin flat material having selected width and thickness such as desired for the upper and lower ring members 1 and 9, first has a middle portion thereof of required length twisted as shown at 5 in Fig. 2. This twisted section 5 after treatment to relieve strains is then placed in a press. The twisted section 5 is located in a V-shaped groove 10 in a lower die 11, and the punch 13 having a similar inverted groove 12 located directly over the section 5 is brought down to upset and flatten the outer edges of the twisted and grooved portion 5 on the four sides as indicated at 14. After this the extending portions at either end of the central twisted section 5 are shaped and formed as first described with the twisted portion coiled between them, to make the complete piston ring.

Figures 5, 6:
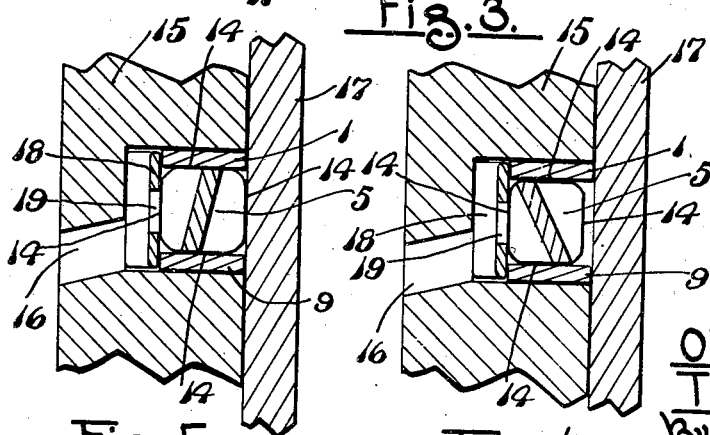
Fig. 5 is a fragmentary vertical section through an engine cylinder in the lower groove of which a ring of our invention is installed, the ring being shown in transverse section.
Fig. 6 is a view like Fig. 5, in which there is a slight modification in structure.

As shown in Fig. 5, the piston ring may be inserted preferably in a lower ring groove of a piston 15 which has oil drainage passages 16 leading through the wall of the piston from the bottom of the groove. The piston operates in a vertical cylinder 17. The ring located in the ring groove is pressed outwardly by a spring expander member 18 of well-known and conventional structure which has oil drainage openings 19, whereby the oil passing through the ring may go through the openings 19 of the expander and thence drain through the passages 16.

It will be noted in Fig. 5 that the central spacing member of the ring generally indicated at 5 has the flattened edges 14 located in vertical and horizontal planes. Thus the upper and lower ring members or sections 1 and 9 have a wider contact or bearing engagement than would be the case against curved edges, and the expander 18 likewise has flattened portions 14 at the inner sides to bear against. In the form shown in Fig. 5, the outer flattened edges 14 may come to and against the cylinder walls of the cylinder 17. In Fig. 6, by using different shapes of coin-press dies, or by otherwise suitably reducing the section of the twisted part to substantially rectangular outline, the outer vertical flattened edges 14 of the spacing section 5 of the ring are located inwardly of the outer curved edges of the upper and lower ring sections 1 and 9, thus making in effect an oil collecting channel between the upper and lower ring sections, at the same time assuring that the force of the expander spring will act primarily to force the upper and lower ring members into contact with the cylinder walls until such ring members have worn to the same radial thickness as the spacer member.

In Fig. 8 the construction is the same except the ring is widened by the addition of an extra ring member or lamination above and below the ring members 1 and 9. The upper ring section 1a of curved form lies directly over the ring section or member 1 and has a downward bend at 2a where it joins integrally with the ring member 1. Similarly, the lowermost ring member 9a is of curved form, like the lower ring member or section 9, and has an upward bend 8a at its integral joinder with the section 9. Of course more than one extra lamination may be used if necessary for still wider rings, or one only of the additional ring parts, either 1a or 9a, may be used if desired.

In Fig. 9 instead of the intermediate portion of the length of thin flat material being in spirally twisted form, such intermediate section is bent into a series of alternating U-shaped bends 20 as shown, against which the ring members 1 and 9 bear above and below. In Fig. 11 the structure is the same except instead of there being alternate U-shaped sections wherein the legs and the connecting portions are at right angles to each other, such sections, shown at 21, are of a continuously reversely curved formation. But with either form the spacing of the upper and lower ring members 1 and 9 is provided and there is ample passage for oil through the ring. In the structure shown in Figs. 13 and 14, the intermediate or spacing member of the ring is bent into a plurality of reversely curved or alternating U-shaped loops located at right angles to the location shown in Fig. 11. To do this the material at the ends of the sections in which the humps 4 and 6 are located is given a quarter twist and is then formed into the alternate U-shaped bends 23, in upper and lower edges of some of which notches 24 are cut for oil passing.

While we have shown the preferred form of ring structure as made of a single length of uniform and homogenous material throughout, it is to be understood that the several ring members and spacer may be of different materials connected together at their ends to make a single length, and that the differing materials which are used do not necessarily have the same cross-sectional dimensions. For example, the spacer member might be made of a thicker material than that used for the outer ring members, or vice versa. Preferably the outer ring members and the spacer member will be integrally or otherwise connected together at their ends; but our invention further contemplates a ring structure having outer ring members and an intermediate spacer member of twisted form which elements of the ring may be separately made and not connected. And the outer ring members and the intermediate spacer member may be made of the same or different materials or of materials having different cross-sectional areas. Where lengths of different materials are used they may be connected together at adjacent ends by use of any of the suitable methods of obtaining such connection.

The ring constructions described are readily produced and provide oil control drainage of a very practical and useful character. There is economy in manufacture, as each ring may be made of a single length of material of uniform width and thickness, and the rings so made are easily installed in place.

The invention is defined in the appended claims and is to be considered comprehensive of all forms of structure coming within their scope.

We claim:

1. A piston ring formed from a single length of flat material comprising, two spaced apart parallel outer ring members each having a free end, and an intermediate spacing member located between the outer members and connected at opposite ends to the other ends of said outer ring members, said intermediate spacing member being substantially uniformly twisted in the direction of its length.

2. A construction containing the elements in combination defined in claim 1, said intermediate twisted spacing member being flattened at its opposite sides at its outer edge portions, against which flattened portions the outer ring members bear and seat, as specified.

3. A construction containing the elements in combination defined in claim 1, said intermediate twisted member having flattened portions at the edges of its inner curved side adapted to provide bearing against which a spring expander is adapted to engage.

4. A construction containing the elements in combination defined in claim 1, said intermediate twisted spacing member at the outer curved side thereof having spaced flattened edge portions adapted to bear against the inner walls of a cylinder, said edge portions being disposed diagonally to the length of the cylinder.

5. A construction containing the elements in combination defined in claim 1, said intermediate twisted spacing member at the outer sides thereof having flattened edge portions located within the outer edges of said spaced outer ring members, whereby a channel for oil reception is provided between the outer portions of said spaced ring members.

6. A piston ring comprising upper and lower thin flat ring members of steel, and an intermediate spacing member between said upper and lower ring members comprising a length of steel having substantially the same cross sectional dimensions as the upper and lower ring members, said intermediate spacing member being substantially uniformly twisted in the direction of its length.

7. A piston ring comprising upper and lower flat ring members and an intermediate spacing member between said upper and lower members comprising a length of flat material substantially uniformly twisted in the direction of its length.

8. A piston ring formed from a length of flat metal comprising, a spacing member twisted substantially uniformly throughout its length so as to be of substantially circular form, the ends of said intermediate section approaching each other and being continued one upwardly and the other downwardly over and under said intermediate spacing member to form upper and lower ring members, the end portions of which overlap each other between the ends of the twisted portion of said intermediate spacing member.

9. A piston ring comprising, a length of material in the form of a helical coil including an intermediate spacing coil of longitudinally twisted form, and flat coils engaging opposed sides of the intermediate coil, the outer sides of said flat coils lying in parallel horizontal planes.

10. A piston ring of helical form comprising, a plurality of substantially circular coils including a middle or intermediate coil of twisted formation lengthwise of the coil, and having extended from the ends thereof a plurality of flat coils of substantially circular form lying one against the other at opposite sides of the intermediate coil, as specified.

OLIVER G. NORTON.
THURLOW E. McFALL.